United States Patent
Ackerman et al.

(10) Patent No.: US 8,475,097 B2
(45) Date of Patent: Jul. 2, 2013

(54) CARGO BARRIER NET

(75) Inventors: David Ackerman, Dorset (GB); James Barry Homewood, Dorset (GB); Stephen Mark Richards, Devon (GB); Russel Neil Willats, Dorset (GB)

(73) Assignee: AMSAFE Bridport (GB)

(*) Notice: Subject to any disclaimer, the term of this patent is extended or adjusted under 35 U.S.C. 154(b) by 412 days.

(21) Appl. No.: 12/645,301

(22) Filed: Dec. 22, 2009

(65) Prior Publication Data
US 2010/0158631 A1 Jun. 24, 2010

(30) Foreign Application Priority Data

Dec. 23, 2008 (GB) .................................. 0823358.7

(51) Int. Cl.
*B60P 7/08* (2006.01)
(52) U.S. Cl.
USPC .............................. 410/118; 410/97; 410/129
(58) Field of Classification Search
USPC ........... 410/96, 97, 117, 118, 129; 244/118.1, 244/137.1; 87/2, 12
See application file for complete search history.

(56) References Cited

U.S. PATENT DOCUMENTS

| | | | |
|---|---|---|---|
| 5,437,474 | A | 8/1995 | Ament |
| 6,435,786 | B1 | 8/2002 | Breckel et al. |
| 6,997,637 | B2 | 2/2006 | Schneider et al. |
| 7,204,457 | B2 | 4/2007 | Ackerman et al. |
| 2002/0085880 | A1 | 7/2002 | Schneider et al. |
| 2004/0109736 | A1* | 6/2004 | Pfeifer et al. ................. 410/118 |
| 2005/0072877 | A1 | 4/2005 | Ackerman et al. |

FOREIGN PATENT DOCUMENTS

| EP | 1470044 B1 | 4/2006 |
|---|---|---|
| GB | 2364983 A | 2/2002 |

OTHER PUBLICATIONS

Search report for corresponding British application No. GB0823358.7.

* cited by examiner

*Primary Examiner* — Stephen Gordon
(74) *Attorney, Agent, or Firm* — Strategy IP, a professional law corporation

(57) ABSTRACT

A cargo barrier net for an aircraft includes a net mesh, defined by a plurality of net strands, a securing members coupled to one of the net strands, for securing the cargo barrier net across an internal space of an aircraft; and a tear webbing located between the securing members and the net strand. The tear webbing is configured to tear progressively when a load is applied to it, thereby increasing the effective length of net strand to which it is coupled and redistributing the load to other net strands in the cargo barrier net.

10 Claims, 3 Drawing Sheets

CARGO BARRIER NET

CROSS-REFERENCE TO RELATED APPLICATION

This application claims the benefit of and priority to United Kingdom Application No. 0823358.7, filed Dec. 23, 2008, the entire content of which is incorporated by reference herein.

FIELD OF THE INVENTION

The present invention relates to a cargo barrier net for an aircraft.

BACKGROUND OF THE INVENTION

Many different types of barrier net exist and they can be used for a wide variety of purposes. Barrier nets are commonly used in the aviation industry, for example, main deck barrier nets in the fuselage of aircraft. It is well known to use nets as barriers on aircraft to restrain cargo that would otherwise move and penetrate into areas occupied by aircraft personnel, critical equipment and systems and/or access door or emergency access routes during the acceleration and deceleration of the aircraft during take-off and landing and also during the extreme deceleration of the aircraft during emergency landing.

Traditionally, such barrier nets comprise a network of webbing members lined up vertically and horizontally and stitched together into a rectangular grid pattern. Alternative configurations of main deck barrier nets include "spider web" nets, in which the webbing members are lined up radially and circumferentially about a central torus and stitched together, and diamond grid nets, such as those disclosed in EP 1470044B. Such nets are conventionally fitted with securing means, e.g. hooks, shackles, quick release fittings, snap latches, and single and double stud floor fittings, to connect the net to the aircraft structure, e.g. attachment points provided spaced around the fuselage and floor of the aircraft.

The success of the net to act as a barrier to moving cargo relies on the net forming a profile when loaded that does not encroach into the areas it is intended to protect, while safely distributing the resulting tensile load into the aircraft structure. Currently available nets suffer from a number of disadvantages, in particular in terms of their ability to allow a net to be designed that imparts near equal loads on all of the attachment points. This can lead to excessively high loads being imposed on certain attachment points and the need for local reinforcing of the aircraft structure. Alternatively, it leads to a complex and expensive net. For example, in the case of a conventional rectangular grid net, the majority of the load is directed horizontally and vertically and only a relatively small portion of the load is imparted in the diagonal directions. This results in an excessively large load being imparted on certain attachment points.

It is an object of the present invention to overcome some of the problems of the prior art, or at least to offer an alternative to the prior art barrier nets.

SUMMARY

According to various embodiments of the present invention, a cargo barrier net for an aircraft includes: a net mesh, defined by a plurality of net strands; a securing means coupled to at least one of the plurality of net strands, for securing the barrier net across an internal space of an aircraft; and a tear webbing located between the securing means and the net strand. The tear webbing is configured to tear progressively when a load is applied to it, thereby increasing an effective length of the coupled net strand and redistributing the load to other net strands in the cargo barrier net.

Tear webbings are well known in other applications, for example, fall arrest harnesses, ejector seat equipment and weapons deployment systems. A tear webbing is generally used to absorb energy, for example, to act as a shock absorber when a user wearing a fall arrest harness falls from a height. A tear webbing generally consists of two leaves of webbing joined together at specified intervals by binding warps, i.e. a material which is only attached to the weft thread of the webbing. When a force is applied between the two leaves of webbing it causes the binding warps to begin to break and the two leaves of webbing gradually begin to come apart, thus helping to absorb the shock. This is useful in a fall arrest harness as it helps to break the fall of a user more gently.

The function of the tear webbing in the present embodiment is slightly different to that found in most other applications. By incorporating at least one tear webbing into a barrier net, it is possible to provide a net which is able to dynamically adapt to arrange a more even distribution of an applied load between the attachment points, e.g. the attachment points on the fuselage and floor of an aircraft. As discussed above, when a load is applied to a barrier net it tends to result in excessively high loads being imposed on certain attachment points, while other attachment points remain fairly unexposed to the load. By incorporating tear webbings into the barrier net between the net strands and the securing means, it is possible to distribute the load more equally between more of the attachment points.

When a load acts upon a barrier net according to the present embodiment, it will be transmitted through the net strands in the usual manner. Initially, certain of the attachment points will experience a larger loading due to the geometry of the net and the size and shape of the load acting upon it. However, when a load of a sufficient magnitude acts on an attachment point, the tear webbing, which is provided between the securing means and the net strand, will begin to come apart. As the webbing leaves of the tear webbing progressively come apart it will effectively increase the length of the net strand. As the length of the net strand increases it will change the profile of the net and cause the load to be shared between some of the other attachment points. The dynamic adjustment of the net continues to occur until the load is more evenly shared between the net attachment points and the load applied to any one attachment point does not exceed a certain maximum value, which corresponds to the tear strength of the tear webbing. The load at which the tear webbing begins to break, i.e. its tear strength, can be adjusted to suit the particular application of the net. Once a load has acted on a net and the tear webbing(s) have been broken, then net may be returned for repair.

In an embodiment of the invention each securing means is spaced from its corresponding net strand by a tear webbing. It is possible to provide tear webbings between only selected net strands and securing means, but it offers a more flexible solution if a tear webbing is provided between each securing means and its corresponding net strand, as it enables the net to deal with a wider range of potential scenarios.

In some embodiments of the invention, the tear webbing is single ply or multiple ply. As will be described below in reference to the drawings, a multiple ply tear webbing is a structure formed from a plurality of single ply tear webbings. The choice of single ply tear webbings or multiple ply tear webbings will be dependent on a number of factors, including cost, weight, strength and the intended application of the barrier net. Preferably, the tear webbing breaks in a controlled and predictable manner. If the tear webbing breaks too quickly, the load will not have time to redistribute evenly. It is preferred to provide a tear webbing which breaks in a controlled, progressive manner and gives sufficient time for the load to be shared between additional attachment points.

The load at which a single ply tear webbing begins to break, i.e. its tear strength, can be varied within a certain range by altering the binder warp between the webbing leaves. This can be done by varying the size of the overlap between the two leaves of webbing and varying the strength of the binding. The tear strength of a single ply tear webbing is typically in the range of 3-8 kN. It is well known how the strength and tear characteristics of tear webbing can be controlled. However, in some applications, e.g. an aviation main deck barrier net, it may be that the tear strength of a single ply tear webbing is insufficient to handle the loads to which the net will be subjected. Main deck barrier nets must typically be capable of handling the force exerted by an aircraft's maximum cargo payload under conditions of 9 g forward movement. In such circumstances, it is envisaged that multiple ply tear webbings may effectively deal with the forces involved. A multiple ply tear webbing is one which comprises a plurality of individual tear webbing elements combined in a single structure. The tear strength of multiple ply tear webbing depends on the number and strength of the individual tear webbing elements which are provided. A multiple ply tear webbing could have as few as two tear webbing elements. In an embodiment of the invention, there is provided in the region of 12-30 individual tear webbing elements in the multiple ply tear webbing. In an embodiment of the invention, the tear strength of the multiple ply tear webbing is from 10 kN, 20 kN, 40 kN, 60 kN, 80 kN, 100 kN or 120 kN. It will be appreciated that the tear strength of the multiple ply tear webbing can be adjusted by varying the size of the overlap between the two leaves of webbing and varying the strength of the binding of some or all of the individual tear webbing elements.

In an embodiment of the invention the barrier net comprises a plurality of tear webbings and the tear webbings are a mixture of single ply and multiple ply. In addition, the tear strength of each single ply tear webbing and each multiple ply tear webbing may be different. The tear strength of each of the tear webbings can be selected to suit the particular application of the barrier net and the anticipated forces to which it will be exposed.

In an embodiment of the invention the barrier net is a main deck barrier net. As discussed above, the present invention has a wide applicability and could prove to be useful in any number of industries. However, due to the issues with the uneven distribution of load in main deck barrier nets in particular this application has been identified as one which would benefit from the present invention.

In an embodiment of the invention the securing means is selected from the group consisting of: shackles; hooks; quick release fittings; snap latches; single stud floor fittings; and double stud floor fittings.

BRIEF DESCRIPTION OF THE DRAWINGS

The invention will now be described, purely by way of example, with reference to the accompanying drawings, in which.

DETAILED DESCRIPTION OF THE PREFERRED EMBODIMENTS

Figure 1:
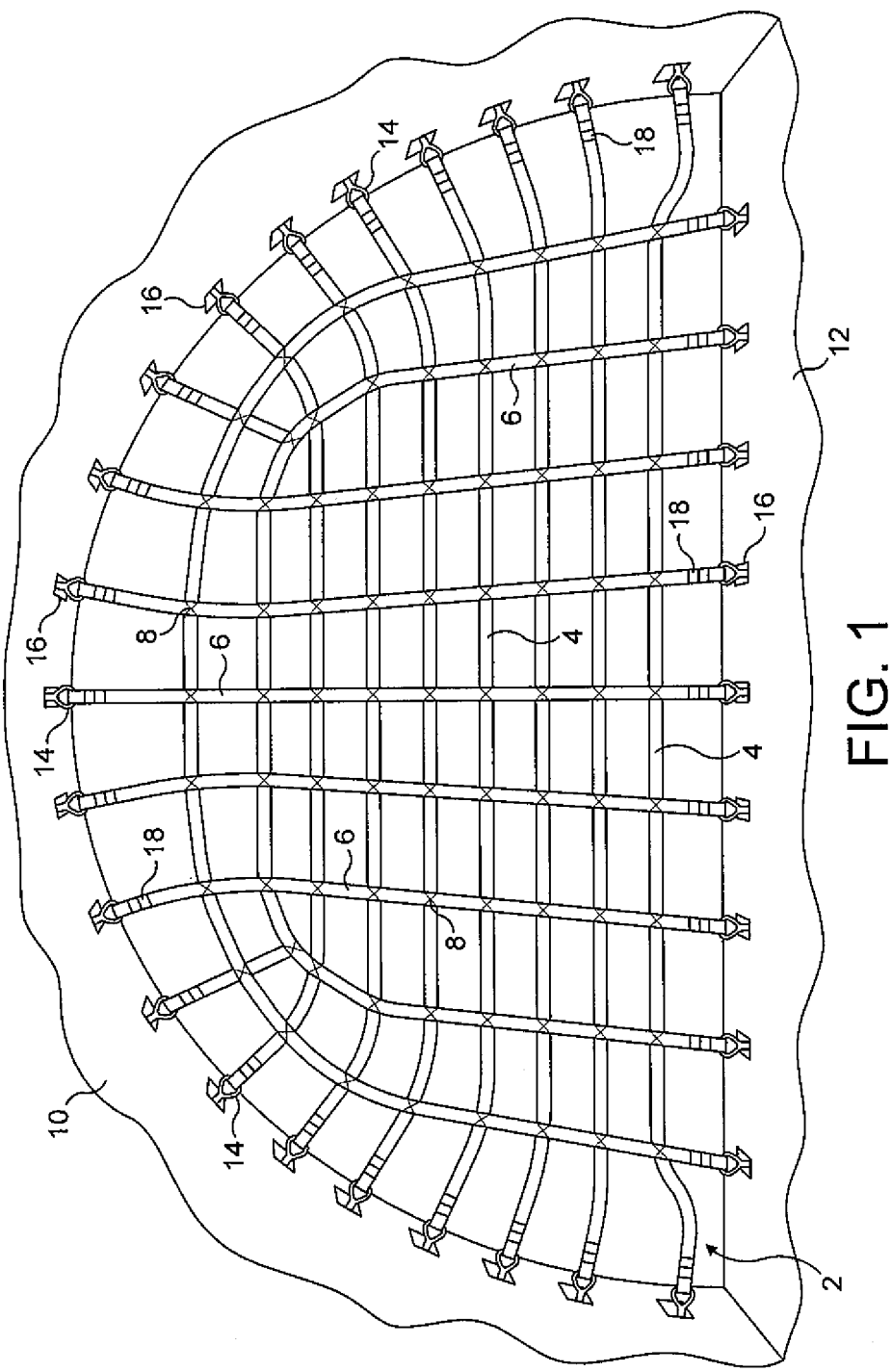
FIG. 1 is a view of a main deck barrier net according to one embodiment of the present invention in the fuselage of an aircraft.

FIG. 1 shows a main deck barrier net 2 according to one embodiment of the present invention. The barrier net 2 is of a generally conventional construction and comprises a plurality of horizontal webbing members 4 and a plurality of vertical webbing members 6 stitched together at their points of intersection 8. The webbing members 4, 6 may be polyester webbing straps, but the present invention can be used with barrier nets made from any material. A barrier net 2 such as this is deemed to have a rectangular grid pattern since the horizontal and vertical webbing members 4, 6 define a rectangular pattern, but it will be clear that the present invention can be incorporated into barrier nets 2 of other designs. The main deck barrier net 2 is deployed across a space defined by the fuselage 10 of an aircraft and the floor 12 of the aircraft. Securing means in the form of shackles 14 are provided at each end of the majority of the horizontal webbing members 4 and at each end of some of the vertical webbing members 6. The shackles 14 are secured to attachment points 16 provided on the fuselage 10 and floor 12 of the aircraft.

As has been discussed above, it has been found that this net geometry does not distribute the load particularly efficiently, with the result that excessively high loads tend to be imparted to some attachment points 16. In particular, when a load acts on the centre of the barrier net 2 the webbing members 4,6 tend to transmit the load horizontally and vertically, but a proportionally smaller amount of the load is imparted in a diagonal direction.

Figure 2:
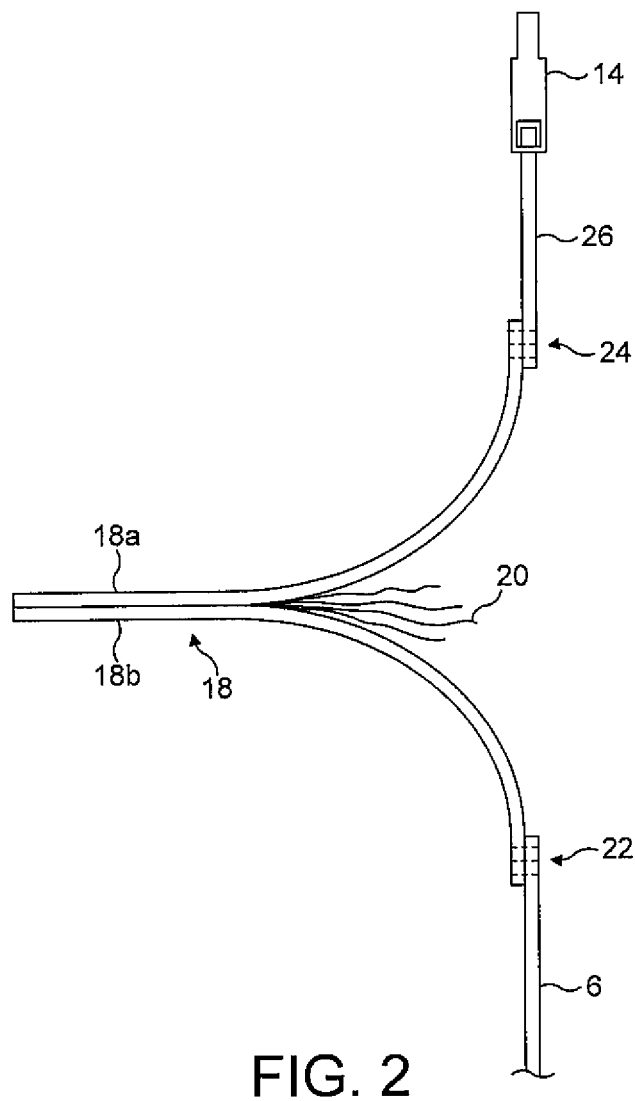
FIG. 2 shows a close up view of a single ply tear webbing according to the embodiment shown in FIG. 1.
Figure 3:
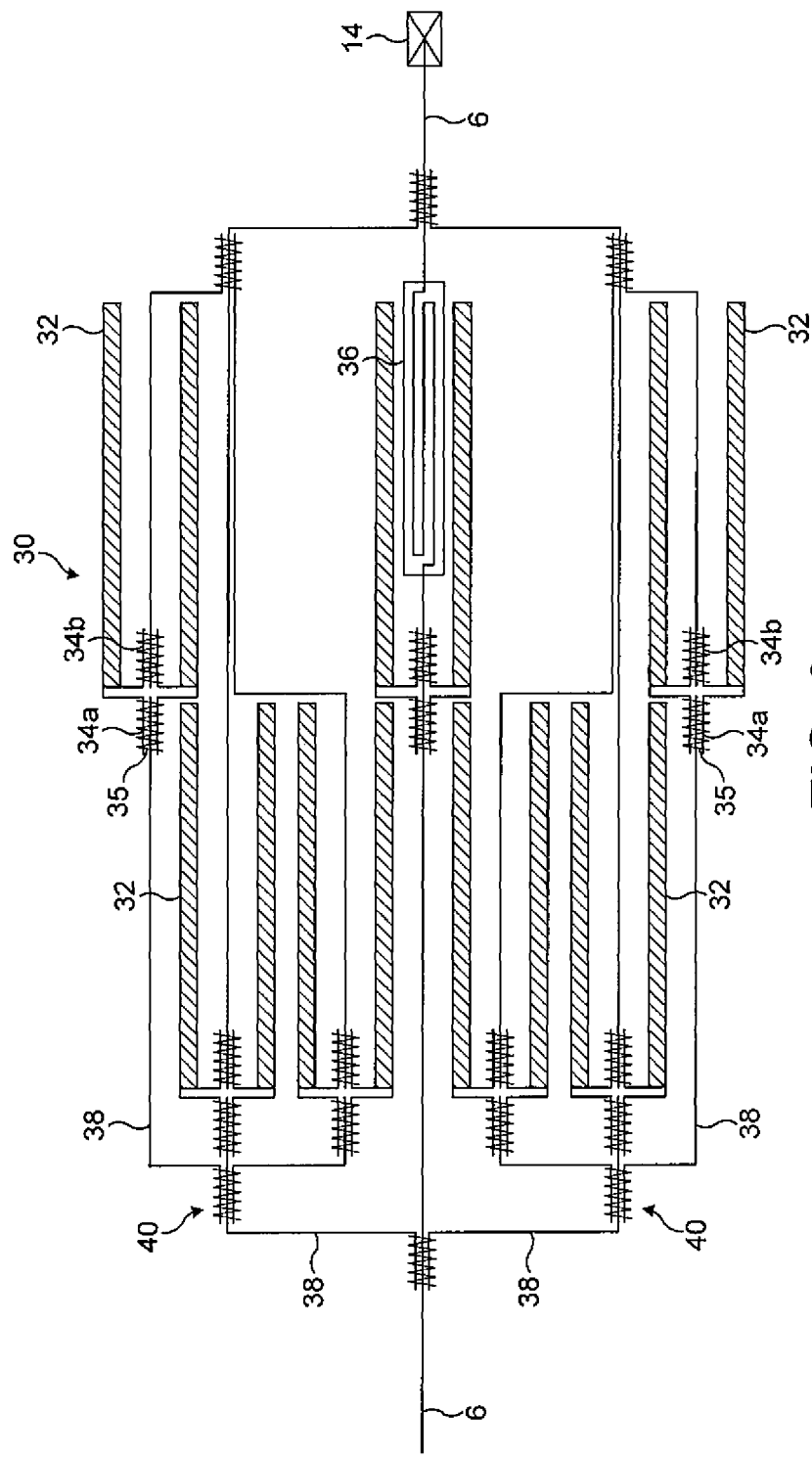
FIG. 3 shows schematic view of a multiple ply tear webbing according to another embodiment of the present invention.

A tear webbing 18 is provided at each end of the webbing members 4, 6, between the webbing member 4, 6 and the securing shackle 14. As shown in FIGS. 2 and 3, the tear webbing may be single ply tear webbing 18 (as shown in FIG. 2) or multiple ply tear webbing 30 (as shown in FIG. 3). The choice of single ply 18 or multiple ply 30 will be dependent on the loads with which the net 2 is designed to deal.

FIG. 2 shows a close up of a net strand 6 of the barrier net 2 with a single ply tear webbing 18 located between the net strand 6 and a securing shackle 14. As can be seen in FIG. 1, the securing shackle 14 will engage with an attachment point 16 on the fuselage 10 and floor 12 of an aircraft in use of the net 2. The single ply tear webbing 18 comprises two leaves of webbing 18a, 18b joined together by a binder warp 20. The two leaves of webbing 18a, 18b are in a parallel, superimposed orientation and the binding warp 20 connects the webbing leaves 18a, 18b together. The binding warp 20 is woven into the fabric of the webbing leaves 18a, 18b in the warp direction only. When a sufficiently large force is applied to the net strand 6 the binder warp 20 begins to break and the two leaves of webbing 18a, 18b start to come apart in a controlled, progressive manner. The force required to pull the webbing leaves 18a, 18b apart can be adjusted by altering the extent of engagement between the binder warp 20 and the webbing leaves 18a, 18b, in terms of the size of the overlap and the strength of the binding. In this embodiment, the webbing members 4, 6 are polyester webbing and the binder warp 20 is also polyester. It will be clear to one having ordinary skill in the art that other materials can be used in the manufacture of barrier nets 2 according to the present invention. These include, but are not limited to, nylon, polyethylene, ultra-high molecular weight polyethylene and aramid fibres.

The net strand 6 overlaps a portion of one of the webbing leaves 18b and the two are secured together by a stitching pattern 22, as is well known in the art. The second webbing leave 18a overlaps with a further length of webbing material 26 and the two are secured together by a suitable stitching pattern 24. The further webbing material 26 is passed through an aperture in the shackle 14 and looped back and stitched to secure the shackle 14.

FIG. 3 shows a schematic view of a net strand 6 with a multiple ply tear webbing 30 located between the net strand 6 and a securing shackle 14. As can be seen in FIG. 1, the securing shackle 14 will engage with an attachment point 16 on the fuselage 10 and floor 12 of an aircraft in use of the net 2. The multiple ply tear webbing 30 is constructed from a plurality of individual tear webbing elements 32 (indicated by shaded area). Each of the individual tear webbing elements 32 which make up the multiple ply tear webbing 30 are formed in the same manner as the single ply tear webbing 18 of FIG. 2. The multiple ply tear webbing 30 comprises 14 individual tear webbing elements 32, but the total number of individual tear webbing elements 32 can be selected to suit the desired characteristics of the net 2. Generally there will be between 12-30 individual tear webbing elements 32 in a multiple ply tear webbing 30. As before, each individual tear webbing element 32 comprises two leaves of webbing 34a, 34b joined together by a binder warp (not shown). The two leaves of webbing 34a, 34b are in a parallel, superimposed orientation and the binding warp connects the webbing leaves 34a, 34b together. In this embodiment, the binding warp is woven into the fabric of the webbing leaves 34a, 34b in the warp direction only.

The net strand 6 passes through the centre of the tear webbing 30 and is attached to the shackle 14. The net strand 6 passes through an aperture in the shackle 14 and is looped back and stitched to secure the shackle 14 in place. A shunt 36 is provided in the net strand 6 to act as a fail safe for the net strand 6. The shunt 36 is a section of excess webbing which ensures that the tear webbing 30 is first to take up any load which is applied to the net strand 6. In the event that all of the individual tear webbing elements 32 break then the net strand 6 will act as a fall back and it will take up the load.

Sections of spacer webbing 38 are provided between the net strand 6 and the individual tear webbing elements 32. The spacer webbing 38 is stitched to the net strand 6 and to further sections of spacer webbing 38 by means of stitching patterns, as is known in the art. The spacer sections 38 are laid on in a cascading manner to enable the individual tear webbing elements 32 to be combined into a single structure.

The advantage of multiple ply tear webbings 30 is that they can generally achieve a far greater maximum tear strength than single ply tear webbing 18. This is important in applications such as main deck barrier nets 2 as the net 2 must be capable of handling the force exerted by an aircraft's maximum cargo payload under conditions of 9 g forward movement. Currently available single ply tear webbing 18 would not be able to handle such large loads and would not break in a controlled and progressive manner. Ideally, for application such as main deck barrier nets 2 the multiple ply tear webbing 30 should begin to break when subjected to a load of 60-110 kN. However, a multiple ply tear webbing 30 comprising two tear webbing elements 32 may have a tear strength as low as 10 kN and the maximum tear strength of a multiple ply tear webbing 30 may exceed 110 kN. The multiple ply tear webbing 30 should then continue to break in a controlled and progressive manner as the load increases.

The general operation of embodiments of the present invention will now be described. It will be understood by one having ordinary skill in the art that the operation of the net 2 will be the same regardless of the specific application and regardless of whether the net 2 is provided with single ply tear webbings 18, multiple ply tear webbings 30 or a combination of both. As discussed above, the choice of single ply or multiple ply is generally based on the strength required. It is envisaged that both single ply and multiple ply tear webbings 18, 30 could be utilised in the same barrier net 2 to provide different properties to individual net strands 4, 6 as required.

When a force is applied to a barrier net 2 across a space it is generally taken up by some of the net strands 4, 6 in preference to others. This means that the attachment points 16 to which those net strands 4, 6 are attached will experience a larger load than the other attachment points 16. However, if the net strand 4, 6 which is experiencing the larger load is provided with a tear webbing 18, 30 then the net 2 can act dynamically to alter the net geometry and redistribute the load. When the net strand 4, 6 experiences the load it is transferred to the tear webbing 18, 30. When the force exceeds a certain predetermined level (which can be determined by the manufacturer) then the tear webbing 18, 30 will begin to break in a controlled progressive manner. As the tear webbing 18, 30 breaks it increases the effective length of the net strand 4, 6 and alters the geometry of the net 2. As the net strand 4, 6 lengthens the load will be shared to other net strands 4, 6, and therefore other attachment points 16 (usually those adjacent to the first net strand 4, 6). If the load experienced by these net strands 4, 6 and attachment points 16 is still too great then their tear webbings 18, 30 will also begin to break in a controlled, progressive manner. This process will continue to occur until the load is evenly distributed in such a manner that none of the attachment points 16 are experiencing a load greater than the predetermined value.

Multiple ply tear webbings 30 function in the same general manner as single ply tear webbings 18. When a load is applied to the net strand 4, 6 it will be transmitted to the multiple ply tear webbing 30. The load can either act on all of the individual tear webbing elements 32 at the same time, or it will act on one or more of the individual tear webbing elements 32 in preference to the others. If the load is above the predetermined value then the individual tear webbing elements 32 will begin to break. As each individual element 32 breaks the load will be transferred to another individual element 32. The effective length of the net strand will gradually increase until such a time as the load is taken up by other net strands 4, 6 and the load experienced by the net strand no longer exceeds the tear strength of the tear webbing 30. As discussed above, the net strand can be provided with a shunt 36, such that in the event that all of the individual tear webbing elements 32 break the net strand 4, 6 will take up the load. This provides a fail safe to ensure that the net is able to function and prevent the cargo from penetrating into the protected area.

The foregoing description is provided purely by way of example and it will be clear to the skilled person that the present invention can be applied to barrier nets in general. The scope of the present invention is limited only by the scope of the claims.

The invention claimed is:

1. A cargo barrier net for an aircraft comprising:
   a net mesh, defined by a plurality of net strands;
   a securing means coupled to one of the plurality of net strands, for securing the barrier net across an internal space of an aircraft; and
   a tear webbing located between the securing means and the one of the plurality of net strands,
   wherein the tear webbing is configured to tear progressively when a load is applied to it, thereby gradually increasing an effective length of the tear webbing and thus an effective length of the one of the plurality of net strands to which it is coupled until such time as the load is distributed more evenly between the tear webbing and the plurality of net strands in the cargo barrier net.

2. A cargo barrier net according to claim 1, wherein the securing means is a first securing means, the tear webbing is a first tear webbing, and the one of the plurality of net strands is a first one of the plurality of net strands, the cargo barrier net further comprising:
 a second securing means coupled to a second one of the plurality of net strands; and
 a second tear webbing located between the second securing means and the second one of the plurality of the net strands.

3. A cargo barrier net according to claim 1, wherein the tear webbing is single ply.

4. A cargo barrier net according to claim 1, wherein the tear webbing is multiple ply.

5. A cargo barrier net according to claim 2, wherein the first tear webbing is single ply and the second tear webbing is multiple ply.

6. A cargo barrier net according to claim 1, wherein the barrier net is a main deck barrier net.

7. A cargo barrier net according to claim 1, wherein the securing means is selected from the group consisting of a: hook; shackle; quick release fitting; snap latch; single stud floor fitting; and double stud floor fitting.

8. A cargo barrier net according to claim 4, wherein the one of the plurality of net strands is provided with a shunt, which is arranged to take up the load in the event that the multiple ply tear webbing fails.

9. A cargo barrier net for an aircraft comprising:
 a net mesh, defined by a plurality of net strands;
 a securing means coupled to one of the plurality of net strands, for securing the barrier net across an internal space of an aircraft; and
 a tear webbing located between the securing means and the one of the plurality of net strands,
 wherein the tear webbing is configured to tear progressively when a load is applied to it, thereby increasing a length of the tear webbing and an effective length of the one of the plurality of net strands to which it is coupled to more evenly distribute the load between the tear webbing and the plurality of net strands in the cargo barrier net.

10. A cargo barrier net for an aircraft comprising:
 a net mesh, defined by a plurality of net strands;
 a securing means coupled to one of the plurality of net strands, for securing the barrier net across an internal space of an aircraft; and
 a tear webbing comprising a first leaf overlapping and fixed to a second leaf, the first leaf fixed to the securing means and the second leaf fixed to the one of the plurality of net strands,
 wherein the first leaf is configured to tear progressively from the second leaf when a load is applied to it, thereby progressively increasing a length of the tear webbing and thus an effective length of the one of the plurality of net strands to which it is coupled to more evenly distribute the load between the tear webbing and the plurality of net strands in the cargo barrier net.

\* \* \* \* \*